US007276109B2

(12) United States Patent
Stockel et al.

(10) Patent No.: US 7,276,109 B2
(45) Date of Patent: Oct. 2, 2007

(54) FOUNTAIN SOLUTIONS CONTAINING ANTIPILING MACROMOLECULES

(76) Inventors: Richard F. Stockel, 475 Rolling Hills Rd., Bridgewater, NJ (US) 08807; Michael Chester Walsh, 2396 Orchard Crest Blvd., Manasquan, NJ (US) 08736

( * ) Notice: Subject to any disclaimer, the term of this patent is extended or adjusted under 35 U.S.C. 154(b) by 0 days.

(21) Appl. No.: 10/813,462

(22) Filed: Mar. 30, 2004

(65) Prior Publication Data

US 2005/0217534 A1 Oct. 6, 2005

(51) Int. Cl.
*B41L 23/00* (2006.01)
*C09K 3/00* (2006.01)

(52) U.S. Cl. .......................... 106/2; 430/331; 101/451

(58) Field of Classification Search .................... 106/2; 430/331; 101/451
See application file for complete search history.

(56) References Cited

U.S. PATENT DOCUMENTS 3,625,715 A * 12/1971 Nasca .......................... 106/2

FOREIGN PATENT DOCUMENTS

| | | |
|---|---|---|
| EP | 91601 | * 10/1983 |
| JP | 05-286279 | * 11/1993 |

* cited by examiner

*Primary Examiner*—C. Melissa Koslow

(57) ABSTRACT

Piling due to ink, paper fibers and/or clay fillers occurs frequently during an offset printing process, resulting in the deterioration in print quality and lost manual time due to the necessity to clean the equipment. It has been experimentally found that small quantities of certain high molecular weight polyethylene oxide polymers can alleviate this serious problem. However, the overall effectiveness will depend on the concentration of the total make-up of component in the fountain solution.

3 Claims, No Drawings

FOUNTAIN SOLUTIONS CONTAINING ANTIPILING MACROMOLECULES

BACKGROUND

Piling is the deposit of unwanted, excess ink and/or paper residue on either the plate or blanket. It is a natural result of the offset printing process, which places ink, paper, plate and blanket in close physical contact under high pressure.

Image area piling, appearing on the plate, interferes with the ink transfer process, causing a gradual deterioration in print quality. Non-image area piling generally accumulates on the blanket, and if permitted to build-up will also reduce quality. This piling has to be removed periodically with solvent or an emulsion of water and solvent, either by hand or an automatic blanket washing system. Without resolution of piling problems, the printer is left with unplanned waste, in the form of printed material, which has to be discarded.

Paper piling is the most common type of non-image area piling seen in the pressroom. It usually comes from Tinting loose paper and particles from either the edges or surface of paper, which accumulates on the blanket. As paper piling builds up, print quality deteriorates, usually seen as lose of highlight dots or gradual lightening in the solid areas.

There are several contributing factors that influence the rate of piling:

1. The amount of water being carried on the plate/blanket. Running too dry generally increase the rate of piling
2. The speed of the inks. Inks formulated with faster oils may tend to dry out and pile rapidly
3. The type of plate used—smooth grain plates usually pile less
4. Paper surface—loose fiber may be pulled off and added to the accumulated ink resin
5. The lubricating ability of the fountain solution

BRIEF DESCRIPTION OF THE INVENTION

This invention describes a novel and new concept to control piling in off-set lithographic printing, which is far superior to any previously disclosed methodology resulting in several advantages.

The improvement of this invention over the prior art is exemplified by several factors:

- Improved printing image due to lack of piling, particularly for long runs greater than 50,000 to 100,000
- Improved productivity and profit ability due to lessening of cleaning the blanket and/or plate of debris, reducing paper waste.
- Product is used in very low concentrations
- Product is biodegradable
- Product is environmentally safe and non-toxic
- Reduce or eliminates the use of organic solvents and/or aqueous—organic solvent emulsions, thus reducing any waste discharge into the water system

DESCRIPTION OF THE INVENTION

It has now been found that incorporation of low levels of certain relatively high molecular weight water miscible/soluble polymers in the fountain solution or alternatively as a single component aqueous solution applied intermittently or continuously on to the lithographic printing roller, that the build-up of fines from paper and ink are greatly inhibited.

A wide variety of water miscible/soluble polymers were tested, however only poly (ethylene oxide) of a certain molecular weight range were found to out perform all others on a consistent basis in actual printing trails including up to 500,000 copy run.

It has been found experimentally that a very effective antipiling agent for acid or neutral fountain solutions is polyethylene oxides (PEO). The PEO of choice has to have a relatively high molecular weight in the range of about 200,000 to about 7,000,000. Specifically the commercial products of Dow Chemical Company know as Polyox™ are suitable. These polymers have a unique property of binding to fine particles like clays, fillers and fines which normally build-up during a typical long run on lithographic printing presses.

The antipiling polymeric additives of this invention are exceedingly effective within the very low range of about 5.0 to about 500.0 ppm in the concentrate fountain solution.

Fountain solutions in general require the presence of a hydrophilic polymer having a film forming ability to protect the non-image of the printing plate as an essential component. Examples of the hydrophilic polymers include natural products and modified products thereof such as gum Arabic, starch derivatives like hydroxy propylated, phosphated and carboxymethylated starch, and synthetic polymers such as polyvinyl alcohol, polyvinyl pyrrolidone, polyacrylamide, polyacrylic acid and copolymers thereof, and many other synthetic polymers containing acid functionalities. By far the most common hydrophilic polymers (desensitizers) are gum Arabic and carboxy methyl cellulose, which is preferred in this invention.

An essential element of the fountain solution is a pH buffering system which can be selected from the group consisting of water soluble organic acids, water soluble inorganic acids and salts thereof, and which exhibit a pH controlling or buffering effect on the fountain solution as well as a corrosion inhibitory effect. Examples of organic and inorganic acids are citric, ascorbic, malic, tartaric, lactic, acetic, gluconic, hydroxyacetic, oxalic, malonic, phosphoric, metaphosphoric, nitric or hydrochloric acid. Examples of salts of these organic and/or inorganic acids are alkali metal, alkaline metal or ammonium salts thereof. These organic or inorganic acids and/or salts thereof may be used alone or in combination.

The fountain solution usually contains components, which act as wetting agents by reducing the surface tension of the essentially aqueous system. The wetting agents usable in this invention are glycols, glycol ethers, glycol esters, and surfactants. Specific examples of polyols are hexyl cellosolve, diethylene glycol, hexylene glycol, 1,5-pentanediol, glycerin, diethylene glycol monomethyl ether, propylene glycol monomethyl ether, diethylene glycol monobutyl ether, dipropylene monobutyl ether, and 2-ethyl-1,3-hexanediol. There are numerous other glycol derivatives that are commercially available, and anybody skilled in the art would be capable of substituting them for the above mentioned compounds in a fountain solution.

Sometimes it is advantaneous to use a combination of solvents to achieve a clear fountain solution. This will depend on the other ingredients in the fountain solution as a general rule the more volar an ingredient is the more nolar is the glycol/glycol derivative e.g., ethylene alycol, propylene glycol, glycerin and the like. When less polar ingredients are present, then solvents like hexamethylene glycol, dipropylene propyl glycol ether and the like is favored. If both volar and less volar ingredients are in the same fountain solution formulation, then a combination of the appropriate solvents would be preferred.

Another property that the glycol derivatives impart is to function as a humectant to prevent the printing plate from drying to rapidly.

A much more potent additive for fountain solutions to improve wetting and lowering surface tension are certain types of surfactants. It has been found that surfactants with a hydrophilic-lipophilic balance (HLB) in the range of about 2 to about 10, or more preferably from about 3 to about 8 are most desirable. It is equally important that the surfactant used in a fountain solution have effective surface tension lowering properties under both equilibrium and dynamic conditions. Dynamic surface tension is a fundamental quantity which provides a measure of the ability of a surfactant to reduce surface tension and provide wetting under high speed applications like conditions found in the lithographic off-set printing industry.

Some suitable nonionic surfactants having the requisite HLB of about 2 to about 12 include those selected from the group consisting of block polymers of propylene oxide and ethylene oxide; block copolymers of propylene oxide and ethylene oxide and ethylene diamine; $C_1$–$C_{20}$ ethoxylate alcohols, amides fatty acid esters, alkanol amides, glycol esters, ethoxylated alkyl phenols, ethoxylated acetylenic glycols, ethoxylated acetylenic carbinols, silicone glycols, silicone alkylene oxide copolymers, trisubstituted ureas, and diesters of dicarboxylic acids.

Some examples of anionic surfactants fatty acid salts, alkanesulfonates, sulfated castor oil, polyoxyethylene-alkyl ether sulfates, polyoxyethylene-alkyl ether phosphates, dialkylsulfo-succinates, and alkylsulfates and alkylnaphthalenesulfonates.

Many other anionic surfactants are available and could be useful if they have the required HLB range of about 2 to about 12.

Years of experience in surfactant technology has taught the combination of surfactants giving better results than when only one surfactant is used. The hydrophilic-lipophilic balance (HLB) rule states that the combination of surfactants is additive based on the weight of each surfactant. For example, if surfactant A is 50 wt. % of the total usage with a HLB of 5, and surfactant B is 50 wt. % with a HLB of 10, then the resulting surfactant combination has an effective HLB of 7.5, which would be acceptable for our invention.

Frequently, it is necessary to use a hydrotrope in a fountain solution most likely due to the presence of a surfactant with a low HLB value, and/or the presence of large amounts of electrolytes.

Hydrotropes are essentially low molecular weight amphiphilic compounds often resembling surfactants in as much as they have hydrophilic groups like sulfonates, phosphates, or carboxylates, and what in surfactant terms maybe described as a low molecular weight hydrophobe. That is to say that the hydrophilic group is attached to an organic moiety that is too short a group to confer true surface active properties. The most common hydrotropes are aromatic sulfonates, aromatic phosphate esters, and di and polycarboxylates. Specific examples, not all inclusive are sodium xylene, para toluene sulfonate, cumen sulfonate, and mixtures of mono and di alkyl phosphates.

In the present invention, a chelating compound is added to sequester any calcium or magnesium ions found in water particularly observed in tap water. These cations have a tendency to precipitate when they encounter certain anions, and can cause serious problems in the printing process. However, such a potential defect can be prevented by adding a chelating compound. Examples of preferred chelators are organic phosphonic acids, phosphonalkanetricarboxylic acid, ethylenetetraacetic acid, nitrilotriacetic acid, 1-hydroxyethane-1,1-diphosphonic acid, and their corresponding sodium or potassium salts, or combinations thereof.

Since water is a breeding medium in the presence of organic matter for various microorganisms like molds, yeasts, bacteria, virus, parasites and the like, it is paramount to have biocides at effective concentrations to kill and/or inhibit their growth. Various effective classes of biocides have been found to function well in fountain solutions. These include, not all inclusive, ortho phenol-phenol (phenolics), chloro-methyl-4-isothiazolin-3-one (isothiazolines), dimethyldimethylol-hydantoin (formaldehyde donors), quats, certain aldehydes like glutaraldehyde, 2-bromo-20-nitrophopane-1,2-diol and other halo containing biocides like 3-iodo-2-propynyl butylcarbamate. Other biocides include sodium dimethyl dithiocarbamate, 2,4-dichlorobenzyl alcohol and hexahydrotriazine.

Further, the fountain solution of the present invention may comprise other additives such as various kinds of coloring agents and anticorrosive agents. For instance, coloring agents may preferably be food dyes. Examples of such dyes include yellow dye such as CI No. 19140 and 15985; red dyes such as CI No. 16185,45430, 16255, 45380 and 45100; purple dyes such as CI No. 42640; blue dyes such as CI No. 42090 and 73015; and green dyes such as CI No. 42095.

Corrosion inhibitors may include ammonium, sodium, potassium or magnesium nitrites or nitrates or combinations of these. Other inorganic corrosion inhibitors include molybdates, tungstates or vanadates. Various phosphates and silicates also provide protection against corrosion on metal plates and equipment. Organic corrosion inhibitors include a variety of triazole derivatives and numerous fatty amine and imidazole compositions. These function by chemisorption on the surface of the metal providing a thin film of protection against electrochemical attach.

EXAMPLE

The following example gives the preferred limits for a typical acid fountain solution of all the ingredients in the concentration form, which is subsequently diluted during a printing run. Typical pH's of acid fountain solutions are usually between 3.2 and 4.8.

Typical pH's of acid fountain solutions are usually between 2.2 and 4.8, but can be formulated with a pH as high as about 5.5 as a limit.

Acid Fountain Solution

- Polyethyleneoxide polymer—5 to 500 ppm of a Polyox™ powder with a molecular weight of about 200,00 to about 7,000,000.
- Inorganic and/or organic salt—0.2 to 5.0 wt. % a phosphate, monohydrogen phosphate, dihydrogen phosphate, metaphosphate, pyrophosphate, acetate, citrate, malate and the like.
- Buffering acid—0.1. 0.3 to 4.0 wt. % of a weak acid like phosphoric, acetic, malic, citric and the like.
- Chelating agent—0.1 to 1.5 wt. % of a aminophosphonic or a aminocarboxylic chelating acid or salt thereof.
- Biocide—0.1 to 1.25 wt. % of an effective biocide like glutaraldehyde, dimethyl-dimethylol hydantoin, isothiazolines, e.g., Kathon™, 2-bromo, 2-nitropropane 1-2 diol, formaldehyde, glyoxal, 3-iodo-2-propynyl butylcarbamate, sodium dimethyldithiocarbamate and the like.

Desensitizing water-soluble polymer—0.5 to 10 wt. % consisting of gum Arabic, carboxymethyl cellulose, hydroxy propyl cellulose, dextrins or other polysaccharides, or mixtures thereof.

Glycols—1.0 to 10.0 wt. % of a glycol, glycol ether or glycol ester.

Surfactant/wetting agent—0.5 to 4.5 wt. % of a non-ionic or anionic surfactant or wetting with a HLB in the range of 2 to about 10.

Hydrotope—1.0 to 5.0 wt. % of a hydrotope like sodium benzene sulfonate, cumen sulfonate and the like.

Dye—as needed

Pure water—add to 100 wt. %.

The above ingredients can also be used within the limits, as described, to prepare neutral fountain solutions with a pH range of about 6.5 to about 7.5. Obviously, the acid components are either eliminated or drastically reduced to achieve a more neutral (between 6.5 to about 7.5) pH range.

Generally, the use of water-soluble polymers for the purpose of desensitizing the elate are not used in neutral fountain solutions, but their use could be optional. If desired to use a desensitizer polymer than about 0.05 to about 5.00 wt. % is added to the fountain solution.

The invention claimed is:

1. A method of using polyethylene oxide polymer as a anti-piling agent dissolved in an essentially aqueous fountain solution, at an effective concentration of about 5 ppm to about 500 ppm said polyethylene oxide polymer having a molecular weight from about 200,000 to about 7,000,000 useful for either acid or neutral fountain solutions.

2. The method of using polyethylene oxide as an anti-piling agent as described in claim 1 useful in an acid fountain solution with a pH range of about 6.5 to about 7.5.

3. The method of using polyethylene oxide as an anti-piling agent as described in claim 1 useful in a neutral fountain solution with a pH range of about 6.5 to about 7.5.

* * * * *